(12) United States Patent
Martin et al.

(10) Patent No.: US 7,026,042 B2
(45) Date of Patent: Apr. 11, 2006

(54) HIGHLY CONDUCTING AND TRANSPARENT THIN POLYMER FILMS FORMED FROM DOUBLE AND MULTIPLE LAYERS OF POLY(3,4-ETHYLENEDIOXYTHIOPENE) AND ITS DERIVATIVES

(75) Inventors: Brett D. Martin, Washington, DC (US); Ranganathan Shashidhar, Woodbridge, VA (US); Nikolay Nikolov, Woodbridge, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 231 days.

(21) Appl. No.: 10/396,444

(22) Filed: Mar. 26, 2003

(65) Prior Publication Data

US 2004/0253439 A1   Dec. 16, 2004

(51) Int. Cl.
  *B32B 27/06*   (2006.01)
  *B32B 33/00*   (2006.01)
(52) U.S. Cl. .................. 428/220; 428/336; 428/411.1; 252/500
(58) Field of Classification Search ............... 252/500; 528/271, 364, 373, 377, 401; 428/411.1, 428/220, 336
See application file for complete search history.

(56) References Cited

U.S. PATENT DOCUMENTS

| 5,035,926 A | 7/1991 | Jonas et al. |
| 5,766,515 A | 6/1998 | Jonas et al. |
| 5,792,558 A | 8/1998 | Jonas et al. |
| 6,235,827 B1 | 5/2001 | Kim et al. |
| 6,248,818 B1 | 6/2001 | Kim et al. |
| 6,403,741 B1 * | 6/2002 | Heuer et al. ................. 526/256 |

* cited by examiner

*Primary Examiner*—Ramsey Zacharia
(74) *Attorney, Agent, or Firm*—John J. Karasek; L. George Legg

(57) ABSTRACT

A polymer film comprising at least two layers, wherein each layer comprises a compound comprising the formula:

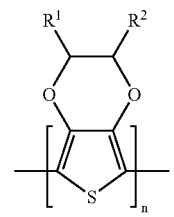

wherein $R^1$ and $R^2$ are independently selected organic groups. A method of making a polymer film comprising the steps of: providing a monomer solution comprising one or more monomers comprising the formula:

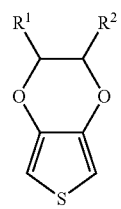

wherein $R^1$ and $R^2$ are independently selected organic groups; dispensing the monomer solution onto a substrate; heating the monomer solution on the substrate to polymerize the monomer; and repeating the steps of providing a monomer solution, dispensing, and heating one or more times, wherein the spin-coating is performed on top of the prior spin-coated layer.

16 Claims, 15 Drawing Sheets

US 7,026,042 B2

HIGHLY CONDUCTING AND TRANSPARENT THIN POLYMER FILMS FORMED FROM DOUBLE AND MULTIPLE LAYERS OF POLY(3,4-ETHYLENEDIOXYTHIOPENE) AND ITS DERIVATIVES

BACKGROUND OF THE INVENTION

1. Field of the Invention

The invention relates generally to multilayer conductive polymer films comprising a poly(3,4-ethylenedioxythiophene).

2. Description of the Prior Art

Conducting polymers can be used in organic light-emitting diodes (OLED's). OLED's are an attractive alternative to liquid crystal display technology because they can yield displays that are brighter, lower cost, consume less power, and are lightweight. Other examples of applications for conducting polymers are anticorrosion coatings and printed circuit board finishes.

Extended π-conjugated conducting oligomers and polymers have unique properties that have impacted diverse technologies, and have resulted in the appearance of new ones. A partial list of current and developing applications includes micro- and nanoscale circuitry, throwaway electronic devices such as plastic electrochromic displays, lightweight storage batteries, corrosion protection coatings, antistatic coatings, bio- and chemical sensors, and military applications such as microwave-absorbing materials. In all of these applications a high degree of polymer transparency in visible wavelengths is either necessary or could represent an additional advantageous trait.

Key properties of π-conjugated conducting oligomers and polymers such as bandgap, dielectric constant, and oxidation potential can be varied over much wider ranges than those of other transparent inorganic conductors such as indium tin oxide (ITO) ceramic. This is because of the vast diversity inherent to the organic chemistry of π-conjugated monomers. Other advantages over metals and inorganics include greater plasticity and elasticity, lower mass density, lower coefficient of thermal expansion, greater resistance to chemicals and corrosion, electrochromism, and enhanced power storage capabilities.

As an example of a specific application wherein a highly transparent conducting polymer could have a large impact, one can consider the liquid crystal display devices (LCD's) that are extremely important in current information technology and OLED's under development for next generation displays. In these devices, or in any display device, transparent electrodes are a prime requirement and ITO coated on glass or clear plastic surfaces has generally been used because of its high transparency (~90%), low surface resistance (~70 ohms/sq), and high conductivity (~1000 S/cm). However, the technology is quite expensive and requires high temperature and vacuum treatment. Moreover, the brittleness of the ITO, the non-stoichiometric nature of ITO surfaces, and poor adhesion at the inorganic-organic interface causes serious problems. The deposition of transparent, conductive polymer film on plastic substrates is a highly promising alternative that allows circumvention of these problems. FIGS. 1 and 2 schematically illustrate embodiments of a LCD (FIG. 1) and an OLED (FIG. 2).

Because conducting oligomers/polymers are highly conjugated, they may be colored both in the neutral undoped (non-conducting) state as well as in the cationic, doped (conducting) state. The development of highly transparent conducting polymer thin films has therefore been challenging. Prior art has centered on three families of conducting polymers, polyaniline (PANI), polypyrrole (PPY), and poly (3,4 alkylenethiophene) (PATP).

Jonas et al., U.S. Pat. No. 5,035,926 discloses single layer coatings of poly(3,4-dioxythiophene) made by surface polymerization.

U.S. Pat. No. 6,327,070 to Heuer et al. discloses PATP's with alkylidene groups such as ethylene, propylene, and butylene as well as those containing phenyl and tetradecyl moieties yielding films with modest properties when formed via electropolymerization. For example, poly(3,4 ethylenedioxythiophene) films had a conductivity of 8 S/cm with a transparency of 52%.

An attractive attribute of the monomeric alkylidenethiophenes is their low oxidation potential (~0.4 V relative to Ag/AgCl) that allows use of mild oxidation agents and results in polymer with high chemical stability. The polymers also have a low band gap (1.5–1.6 eV), causing their absorption $\lambda_{max}$ values to appear at relatively long wavelengths (590 nm for the undoped form and 775 nm for the doped form). The corresponding colors are dark violet and sky blue. The absorption in the doped conducting form is shifted into the infrared region and therefore the polymers become less heavily colored and are more transparent to the human eye. Within this class of conducting polymers, by far the most extensively investigated has been poly(3,4 ethylenedioxythiophene), or PEDOT, the simplest one from the standpoint of chemical structure. FIG. 3 illustrates the reaction scheme for the polymerization of PEDOT into both doped and undoped forms.

A polymerization method that is well suited for monomers with low oxidation potential such as PEDOT utilizes an oxidant, a base, and an alcohol solvent oxidant. At moderately high temperatures (~100° C.) the polymerization occurs very rapidly. De Leeuw et al., "Electroplating of Conductive Polymers for the Metallization of Insulators," Synth. Metals, 66(3), 263 discloses that if the reactant-containing solution is spin-coated onto a suitable substrate such as plastic or glass and then heated, highly conducting insoluble sky-blue films are formed. FIG. 4 illustrates the reaction scheme for the polymerization of PEDOT by surface polymerization. See also Kumar et al., "Conducting Poly(3,4-alkylenedioxythiophene) Derivatives as Fast Electrochromics with High-Contrast Ratios," Chem. Mater., 10(3), 896 and Pei et al., "Electrochromic and Highly Stable Poly(3,4-ethylenedioxythiophene) Switches Between Opaque Blue-black and Transparent Sky Blue", Polymer, 35(7), 1347–1351.

SUMMARY OF THE INVENTION

The invention comprises a conductive polymer film comprising at least two layers, wherein each layer comprises a compound comprising Formula (1):

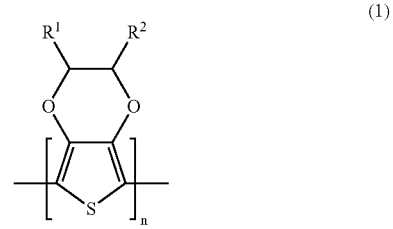

wherein $R^1$ and $R^2$ are independently selected organic groups.

The invention further comprises a method of making a conductive polymer film comprising the steps of: providing a monomer solution comprising one or more monomers comprising Formula (2):

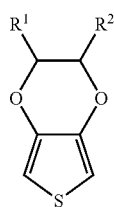

(2)

wherein $R^1$ and $R^2$ are independently selected organic groups; dispensing the monomer solution onto a substrate; heating the monomer solution on the substrate to polymerize the monomer; and repeating the steps of providing a monomer solution, spin-coating, and heating one or more times, wherein the spin-coating is performed on top of the prior spin-coated layer.

DETAILED DESCRIPTION OF THE PREFERRED EMBODIMENTS

Figure 1:
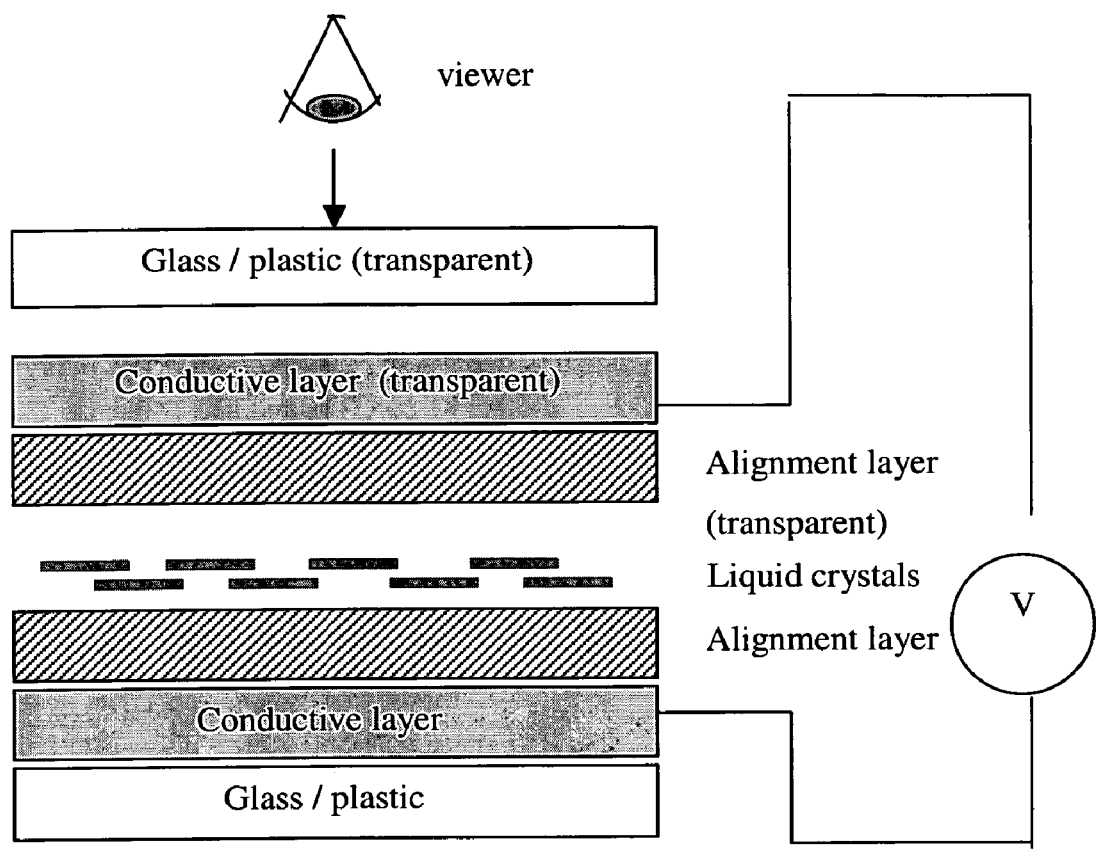
FIG. 1 is schematic illustration of the construction of an embodiment of a LCD device.
Figure 2:
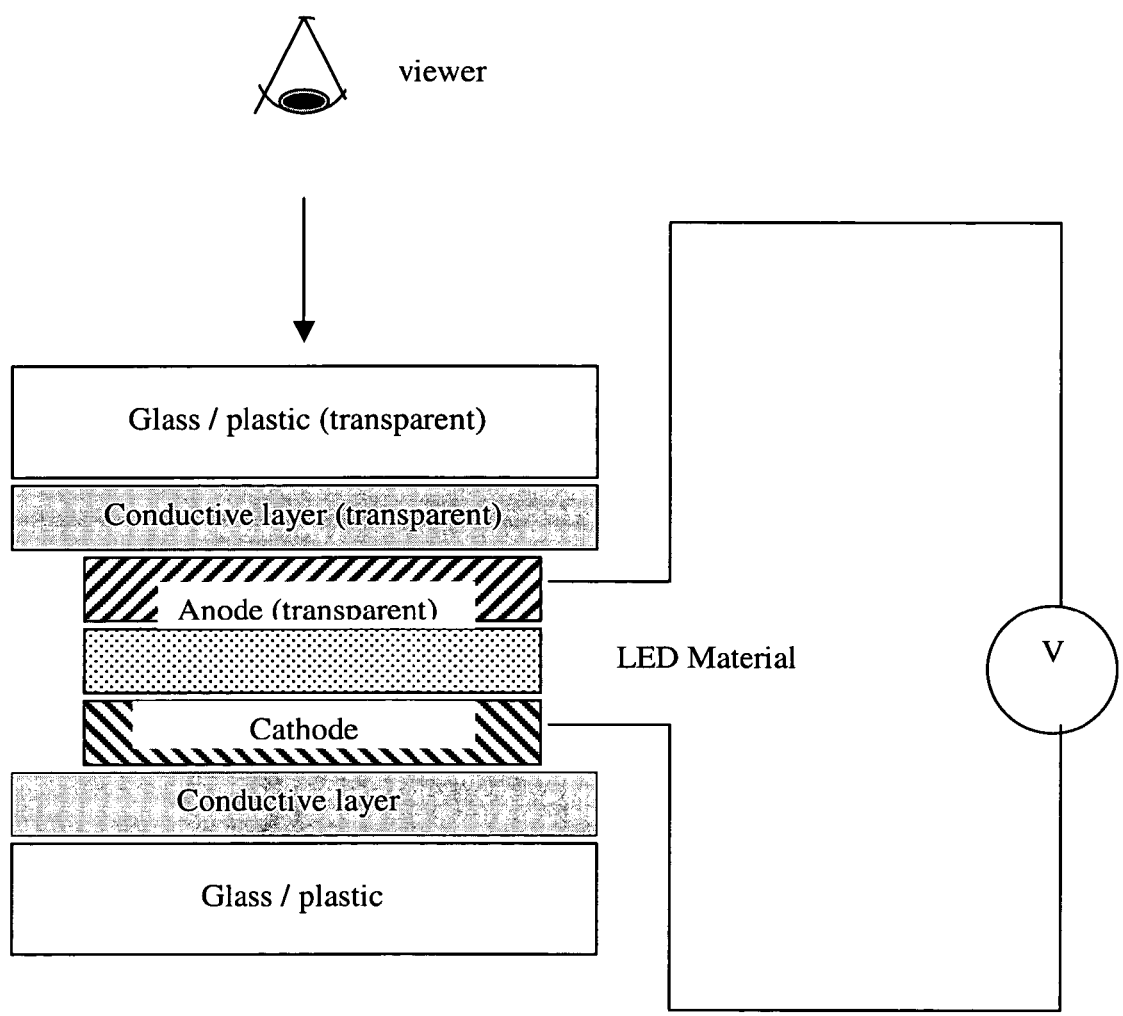
FIG. 2 is schematic illustration of the construction of an embodiment of an OLED device.
Figure 3:
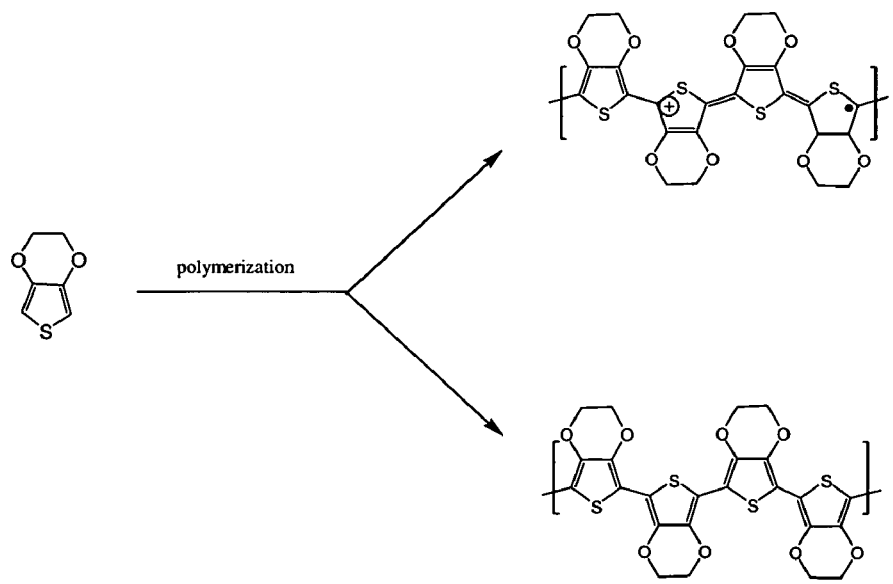
FIG. 3 illustrates the reaction scheme for the polymerization of PEDOT into both doped and undoped forms.
Figure 4:
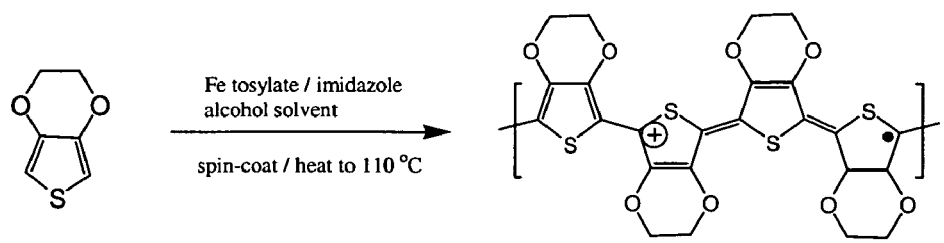
FIG. 4 illustrates the reaction scheme for the polymerization of PEDOT by surface polymerization.

The invention comprises a method of forming highly conducting transparent polymer films based on poly(3,4 ethylenedioxythiophene) and its derivatives. In this spin-coating procedure, more than one thin layer is sequentially polymerized on a substrate. Key polymer properties such as conductivity, low surface resistance, and optical transparency may be improved in this manner. Two layered thin films with a given additive thickness may possess a higher bulk conductivity, a lower surface resistance, and a transparency equal to or greater than that of a single layer film of the same thickness. In some instances, this can be the case even if the total thickness of the double-layer film is less than that of the thick single-layer film. For example, single-layered poly(3,4 ethylenedioxythiophene) (PEDOT) with a film thickness of 0.2 microns may have a surface resistance of 350 ohms and a 75% transparency in the visible regime, but double-layered PEDOT with a film thickness of 0.15 microns may have a significantly lower surface resistance of 280 ohms and a slightly higher transparency of 77%. This behavior may be especially pronounced if perfluoroalkyl-derivatized PEDOT is used in place of normal PEDOT. Using the double- or multiple-layering method, films with very high conductivities (716 S/cm) with concomitant high transparencies (82%) have been formed.

The method of the invention comprises the steps of providing a monomer solution, spin-coating, heating, and repeating. The monomer solution comprises one or more monomers comprising Formula (3):

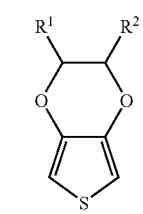

(3)

wherein $R^1$ and $R^2$ are independently selected organic groups. As used herein, the term "organic groups" includes hydrogen and hydroxyl. The monomer solution may comprise a plurality of monomers or a single monomer. $R^1$ and $R^2$ may be independently selected from the group consisting of hydrogen, alkyl, alkenyl, alkynyl, aromatic, ether, ester, hydroxyl, amine, thiol, thione, sulfide, sulfonate, phosphine, phosphate, and phosphonate.

In some embodiments, both $R^1$ and $R^2$ are hydrogen so that the monomer is 3,4-ethylenedioxythiophene. In some embodiments, $R^2$ is an ester such that the monomer comprises Formula (4):

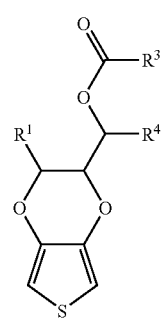

(4)

wherein $R^3$ and $R^4$ are independently selected organic groups. In this monomer, $R^1$ and $R^4$ may both be hydrogen.

R³ may be a fluorinated group selected from the group consisting of alkyl, linear alkyl having from 1 to 14 carbon atoms, aromatic, cycloaliphatic, carbohydrate, amine, ketone, ether, alkenyl, alkynyl, secondary amine, tertiary amine, thione, sulfide, sulfonate, sulfate, phosphine, phosphate, and phosphonate. Suitable R³ groups include, but are not limited to, perfluoroalkyl, 1,1,2,2,3,3,4,4,4-nonafluorobutyl, and 1,1,2,2,3,3,4,4,5,5,6,6,7,7,8,8,8-heptadecylfluorooctyl. The latter two monomers are shown in Formula (5).

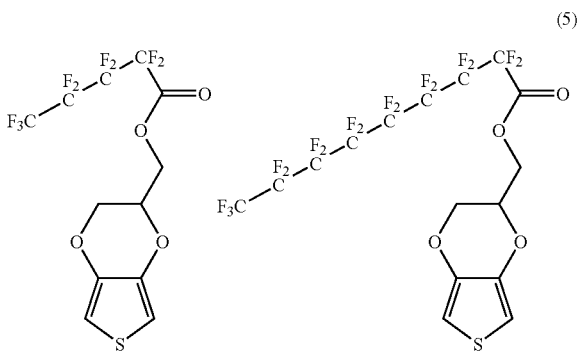

(5)

The monomer solution can also comprise an oxidant, a base, and an alcohol solvent. This mixture may catalyze the polymerization of the monomer. Iron (III) p-toluenesulfonate is a suitable oxidant and imidazole is a suitable base. Suitable alcohol solvents include, but are not limited to, alcohols having from one to five carbon atoms, 1-butanol, 2-propanol, and 2-methoxyethanol.

In the dispensing step, the monomer solution is dispensed onto a substrate. This may be done by spin-coating. The substrate may comprise, but is not limited to, a plastic, a glass, a metal, and/or a ceramic. The quantity of the solution and the speed of spinning may be selected such that the resulting polymer layer is no more than about 0.5 μm thick.

In the heating step, the spin-coated monomer solution is heated to polymerize the monomer. Suitable heating conditions include, but are not limited to, a temperature of from about 80 to about 120° C. and a time of no more than about 3 minutes. The polymer layer may also be washed and/or dried. Optimization of the heating parameters is within the ordinary skill in the art. The process of spin-coating and heating is referred to herein as surface polymerization.

In the repeating step, the steps of providing a monomer solution, dispensing, and heating are repeated one or more times. Each successive layer is placed on top of the previous layer to build up a multilayer polymer film. The same monomer solution can be used in each repetition, or different monomer solutions can be used. There is no limit to the number of times the repeating step may be performed. However, one to three and one to nine repetitions are suitable.

The invention also comprises a polymer film comprising at least two layers, wherein each layer comprises a compound comprising Formula (1). Formula (1) may be a homopolymer or may have more than one monomer. The R¹ and R² substituents are as described above. The film may be made by the method described above, although the invention is not limited to films made by this method. There is no limit to the number of layers in the film. However, two to four and two is ten layers are suitable.

The polymer film may have high conductivity and high transparency. The film may have a conductivity of at least about 100 S/cm and a transparency of at least about 80%. These properties can make the polymer film useful in display devices. A display device can be fabricated from the polymer film by methods known in the art.

Surface polymerization can produce films with low surface resistance. However, single-layer films may not possess acceptable combinations of two major properties crucial for display application, i.e. low film surface resistance and high optical transparency. Typical values for single-layer films are in the range 200–350 ohms and 50–75 percent transparency in the visible range. The surface resistance (SR) values correspond to conductivity values of 170 and 100 S/cm, respectively (conductivity=1/(SR·film thickness)). By optimizing various process parameters, molar ratios between components, spinning speed, polymerization temperature, polymerization time, reaction solvent, and total concentration of solution the surface resistance may be maintained in the above range while raising the optical transparency into the range of 60–85 percent in a single-layer film. However, this optimization procedure may not produce a desired combination of 100 ohms (500 S/cm) and 85% T.

However, the double- or multiple-layer coating technique can produce a film with a conductivity of 714 S/cm and an optical transparency of 82%. Films constructed using this approach can have lower surface resistance and higher transparencies than their single-layer counterparts. The double- or multiple-layer approach thus allows these two key film properties to be correlated in a positive manner. Derivatized EDOT can yield films with conductivities and transparencies superior to those formed from underivatized EDOT.

For the polymerization of 3,4-ethylenedioxythiophene and its perfluoroalkyl derivatives, the advantages of the double- and multilayer methods are that they may lead to the formation of thin conducting polymer films with maximized desirable properties such as high conductivity, low surface resistance, and high optical transparency. Two layered thin films with a given additive thickness can possess a higher bulk conductivity, a lower surface resistance, and a transparency equal to or greater than that of a single layer film of the same thickness.

Film properties may be optimal if the number of layers is increased to up to ten while using faster spin-coating speeds to attain thinner films. Also, the double- or multilayering process can be employed for the polymerization of other derivatives of 3,4 ethylenedioxythiophene such as those containing an alkane, alkene, alkyne, or aromatic group, or an ether, hydroxyl, amine, thiol, thione, sulfide, sulfonate, sulfate, phosphine, phosphate, or phosphonate.

Having described the invention, the following examples are given to illustrate specific applications of the invention. These specific examples do not limit the scope of the invention described in this application.

Comparison of Single vs. Double-Layered Films

EXAMPLE 1

Figure 5:
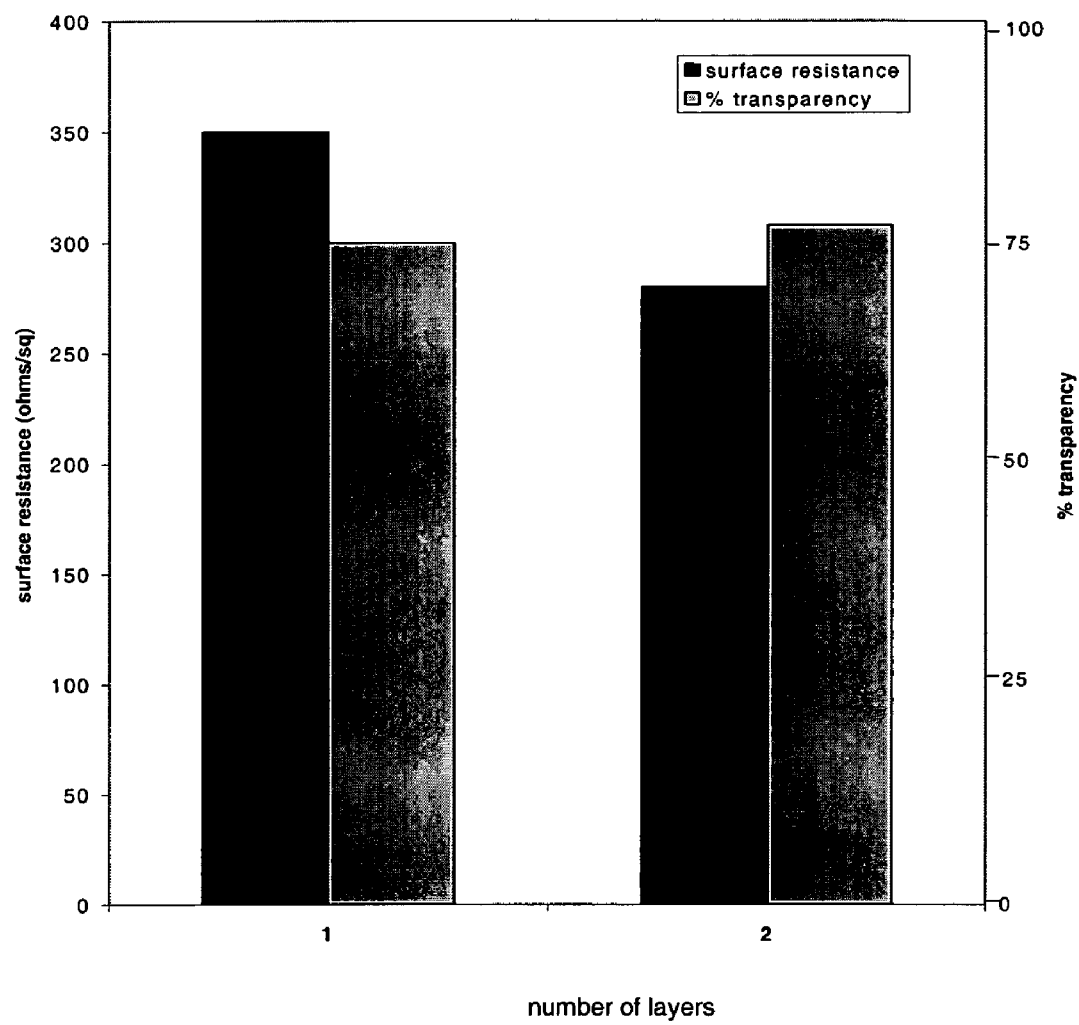
FIG. 5 is a graph comparing the properties of single and double layered films as made in Example 1.

Formation of single- and double-layered thin films of poly(3,4 ethylenedioxythiophene) and comparison of properties—The results for Example 1 are given in FIG. 5. The polymer film was synthesized using an EDOT monomer solution in 3 mL 1-butanol that contained 0.85 M iron (III) tosylate, 0.66 M imidazole, and 0.33 M EDOT. The total solute concentration was 40% by weight.

For the single coating, 1.0 mL of the monomer solution was pipetted onto a clear plastic (polyethylene terepthalate) square substrate having a thickness of 0.1 mm and a surface area of 6.5 cm$^2$. The substrate was spin-coated using a spin speed of 3000 RPM. To form the polymer film, the substrate was immediately heated at atmospheric pressure to 110° C. for 3 min. It was then rinsed with methanol, dried with nitrogen gas and its surface resistance and transparency were quantified and found to be 350 ohms/square and 75% (averaged over the range 350–750 nm), respectively. The film thickness was measured gravimetrically and found to be 0.2±0.03 µm.

For the double coating, the monomer solution was spin-coated using a spin speed of 8000 RPM onto substrates identical to those described above, and polymerization was performed by heating the coated substrate to 110° C. for 10 minutes, as above. The film was rinsed with methanol and dried under nitrogen gas. Additional monomer solution (1.0 mL) was pipetted onto the polymer film and spin-coated, again using a spin speed of 8000 RPM. The double-layered film was rinsed with methanol, dried under nitrogen gas as above, and its surface resistance and transparency were quantified and found to be 280 ohms/square and 77% (averaged over the range 350–750 nm), respectively. The thickness of the double film was measured gravimetrically and found to be 0.15±0.03 µm.

Comparison of properties shows that the double-layered film has a surface resistance 20% lower than that of the single-layer film, and has a slightly higher transparency. Furthermore, the total thickness of the double film is 25% less than that of the single film. Therefore, the layering method yields films that have superior properties even though they are thinner than their single-layer counterpart.

EXAMPLE 2

Figure 6:
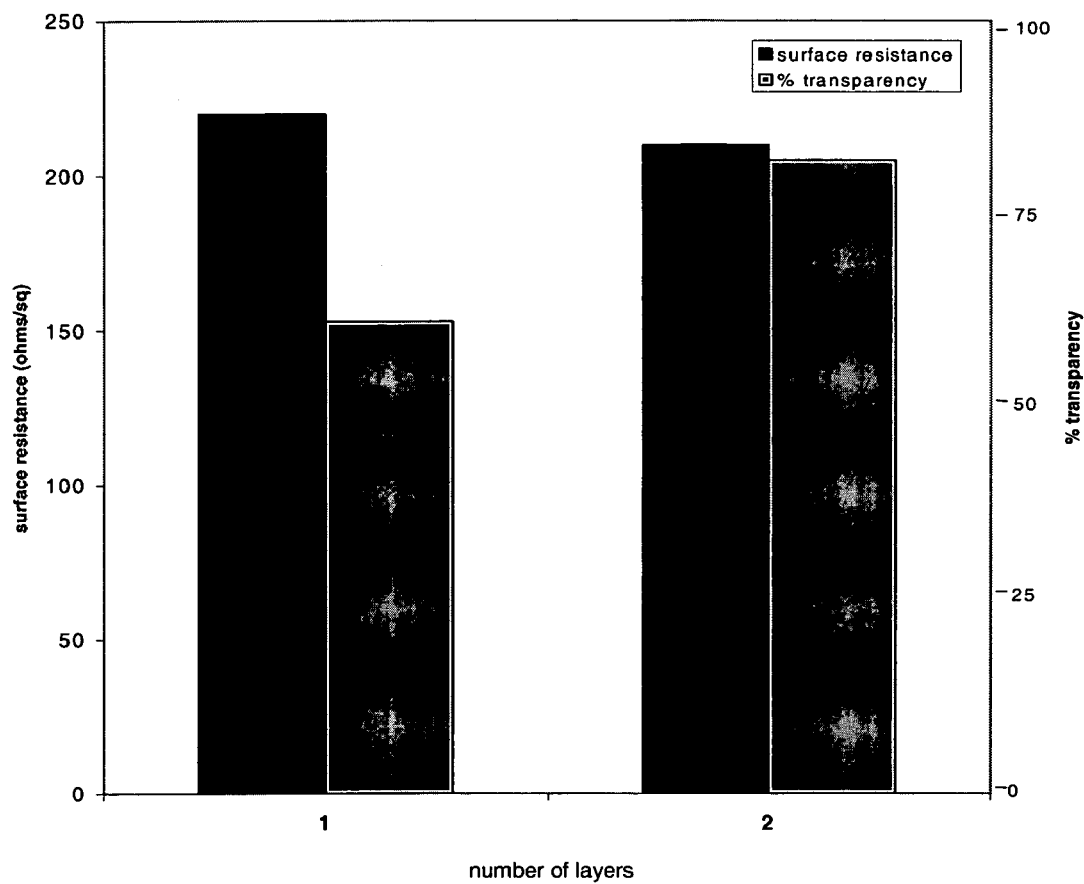
FIG. 6 is a graph comparing the properties of single and double layered films as made in Example 2.

Formation of single- and double-layered thin films of poly(3,4 ethylenedioxythiophene) and comparison of properties—The results for Example 2 are given in FIG. 6. The polymer film was synthesized using an EDOT monomer solution in 3 nL 1-butanol that contained 0.66 M iron (III) tosylate, 0.66 M imidazole, and 0.33 M EDOT. The total solute concentration was 37.5%.

For the single coating, 1.0 mL of the monomer solution was pipetted onto a clear plastic (polyethylene terepthalate) square substrate having a thickness of 0.1 mm and a surface area of 6.5 cm$^2$. The substrate was spin-coated using a spin speed of 1000 RPM. To form the polymer film, the substrate was immediately heated at atmospheric pressure to 110° C. for 3 min. It was then rinsed with methanol, dried with nitrogen gas and its surface resistance and transparency were quantified and found to be 220 ohms/square and 61% (averaged over the range 350–750 nm), respectively. The film thickness was measured gravimetrically and found to be 0.25±0.03 µm.

For the double coating, the monomer solution was spin-coated using a spin speed of 8000 RPM onto substrates identical to those described above, and polymerization was performed by heating the coated substrate to 110° C. for 3 minutes, as above. The film was rinsed with methanol and dried under nitrogen gas. Additional monomer solution (1.0 mL) was pipetted onto the polymer film and spin-coated, again using a spin speed of 8000 RPM. The double-layered film was rinsed with methanol, dried under nitrogen gas as above, and its surface resistance and transparency were quantified and found to be 210 ohms/square and 82% (averaged over the range 350–750 nm), respectively. The thickness of the double film was measured gravimetrically and found to be 0.15±0.03 µm.

Comparison of properties shows that the double-layered film has a transparency that is 26% higher than that of the single-layer film, and has a surface resistance that is 5% lower. In this case, the total thickness of the double film is 40% less than that of the single film. This is a dramatic example showing that the layering method yields films that have superior properties even though their additive thickness is less than their single-layer counterpart.

EXAMPLE 3

Formation of single- and double-layered thin films of poly(2,2,3,3,4,4,5,5,5-nonafluoropentanoic acid 2,3-dihydro-thieno[3,4-b][1,4]dioxin-2-ylmethyl ester 3,4 ethylenedioxythiophene) and comparison of properties—2,3-Dihydro-thieno[3,4-b][1,4]dioxin-2-yl)-methanol (hereafter referred to as CH$_2$OH-EDOT) was esterified using 2,2,3,3, 4,4,5,5,5-nonafluoropentanoic acid and (1-ethyl-3-(3-dimethylaminopropyl)carbodiimide HCl) (EDC) catalyst in THF. The product, 2,2,3,3,4,4,5,5,5-nonafluoropentanoic acid 2,3-dihydro-thieno[3,4-b][1,4 ]dioxin-2-ylmethyl ester (hereafter referred to as C$_4$F$_9$-EDOT, MW 418) was isolated in a 76% overall yield and characterized using $^1$H and $^{13}$C NMR, GC-MS, and elemental analysis.

Figure 7:
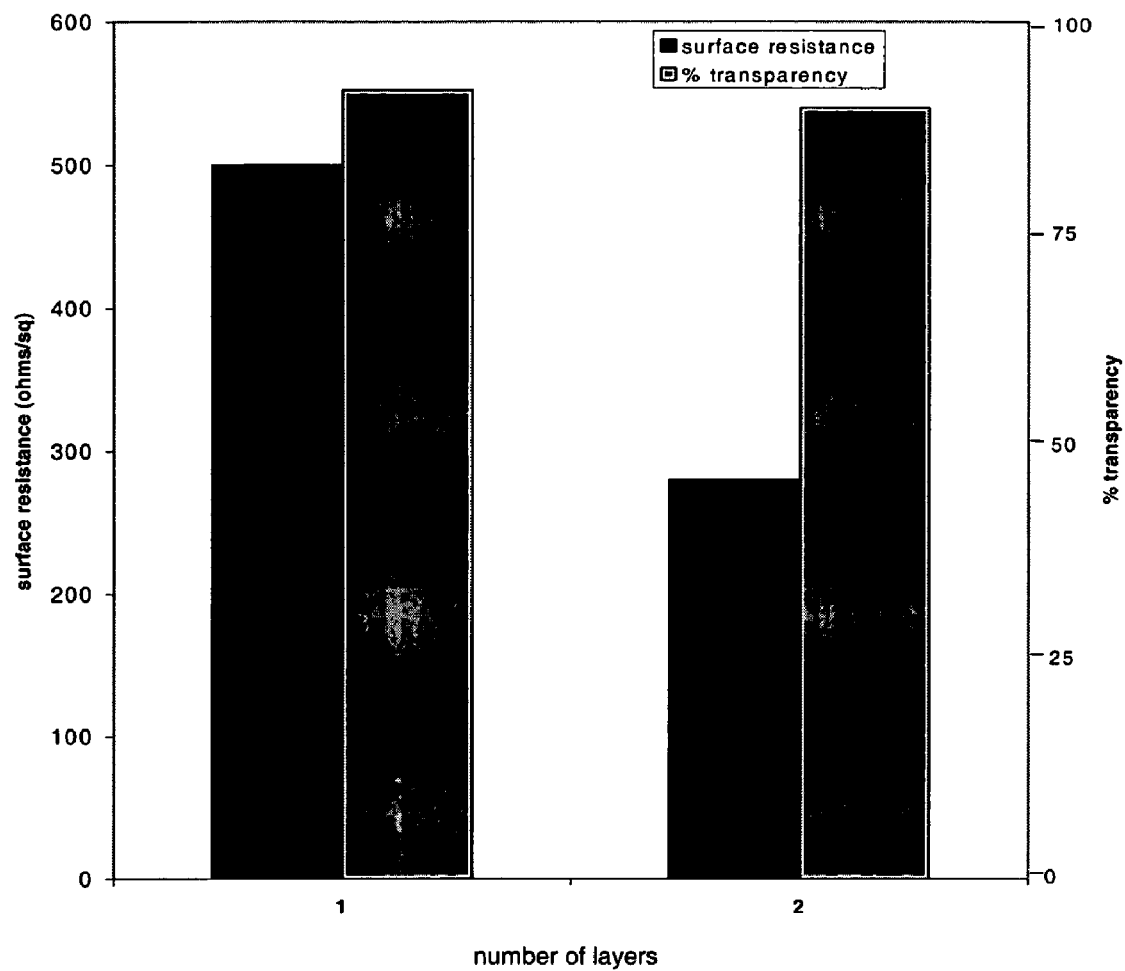
FIG. 7 is a graph comparing the properties of single and double layered films as made in Example 3.

The results for Example 3 are given in FIG. 7. The polymer films were synthesized using a C$_4$F$_9$-EDOT monomer solution in 3 mL 2-methoxyethanol that contained 0.58 M iron (III) tosylate, 0.66 M imidazole, and 0.33 M C$_4$F$_9$-EDOT. The total solute concentration was 35%.

For the single coating, 1.0 mL of the monomer solution was pipetted onto a clear plastic (polyethylene terepthalate) square substrate having a thickness of 0.1 mm and a surface area of 6.5 cm$^2$. The substrate was spin-coated using a spin speed of 3000 RPM. To form the polymer film, the substrate was immediately heated at atmospheric pressure to 110° C. for 3 min. It was then rinsed with methanol, dried with nitrogen gas and its surface resistance and transparency were quantified and found to be 500 ohms/square and 94% (averaged over the range 350–750 nm), respectively. The film thickness was measured gravimetrically and found to be 0.17±0.03 µm.

For the double coating, the monomer solution was spin-coated using a spin speed of 6000 RPM onto substrates identical to those described above, and polymerization was performed by heating the coated substrate to 110° C. for 3 minutes, as above. The film was rinsed with methanol and dried under nitrogen gas. Additional monomer solution (1.0 mL) was pipetted onto the polymer film and spin-coated, again using a spin speed of 6000 RPM. The double-layered film was rinsed with methanol, dried under nitrogen gas as above, and its surface resistance and transparency were quantified and found to be 280 ohms/square and 92% (averaged over the range 350–750 nm), respectively. The thickness of the double film was measured gravimetrically and found to be 0.17±0.03 µm.

Comparison of properties shows that the double-layered film has a surface resistance that is 44% lower than that of the single-layer film, but its transparency is only 2% less. Both film thicknesses are the same. With regard to reduction in surface resistance, this example shows that the multilayering strategy can be even more effective when derivatized EDOT monomer is used vs. underivatized EDOT—the former allowed a 44% reduction in resistance whereas the latter allowed only a 25% reduction (i.e., Example 1).

EXAMPLE 4

Figure 8:
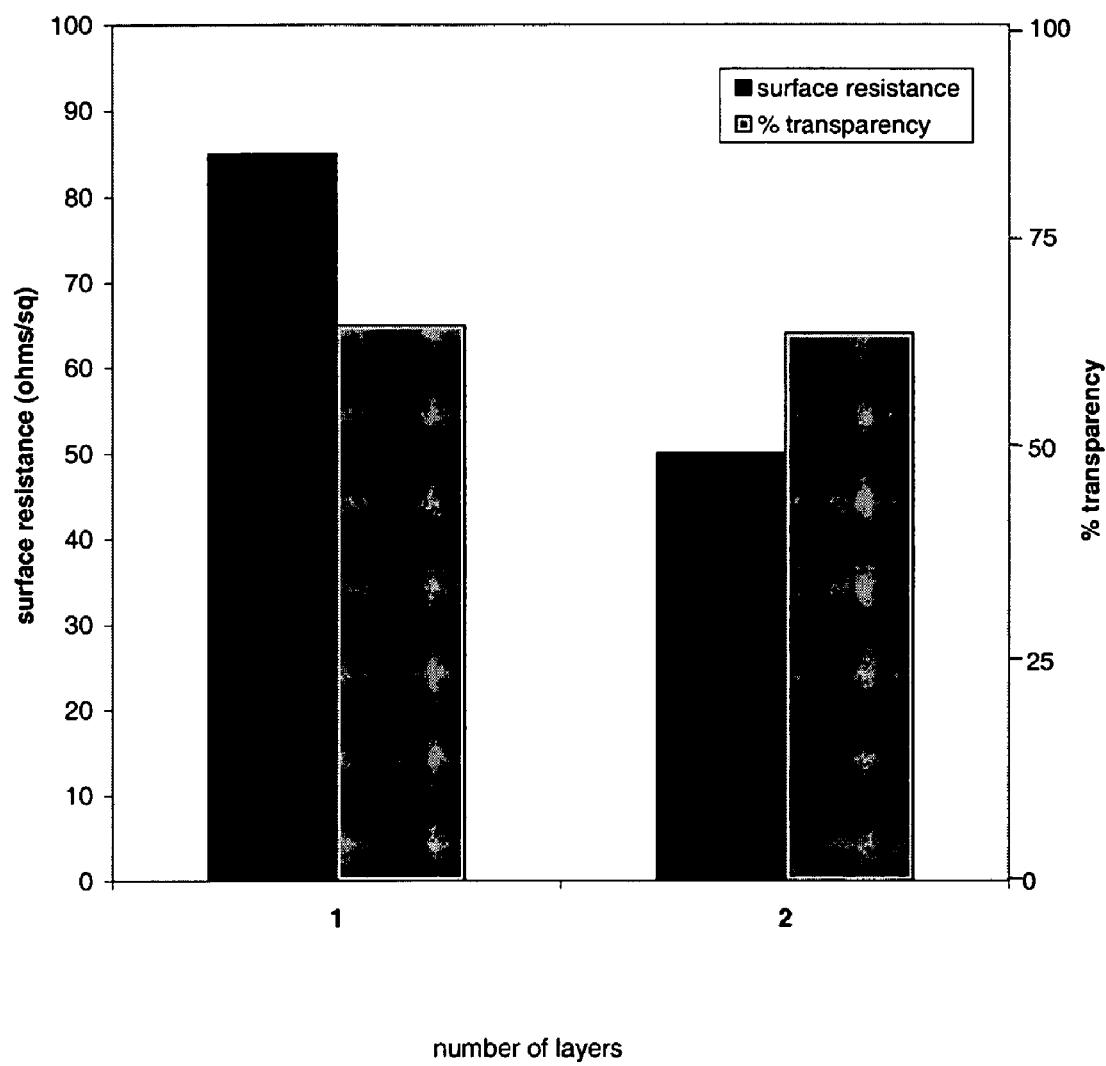
FIG. 8 is a graph comparing the properties of single and double layered films as made in Example 4.

Formation of single- and double-layered thin films of poly($C_4F_9$-EDOT-co-$CH_2OH$-EDOT) and comparison of properties—The results for Example 4 are given in FIG. 8. The polymer films were synthesized using an equimolar solution of $C_4F_9$-EDOT and $CH_2OH$-EDOT in 3 mL 2-propanol that contained 0.58 M iron (III) tosylate, 0.66 M imidazole, and 0.33 M monomer mixture. The total solute concentration was 38%.

For the single coating, 1.0 mL of the monomer solution was pipetted onto a clear plastic (polyethylene terepthalate) square substrate having a thickness of 0.1 mm and a surface area of 6.5 $cm^2$. The substrate was spin-coated using a spin speed of 3000 RPM. To form the polymer film, the substrate was immediately heated at atmospheric pressure to 110° C. for 3 min. It was then rinsed with methanol, dried with nitrogen gas and its surface resistance and transparency were quantified and found to be 85 ohms/square and 65% (averaged over the range 350–750 nm), respectively. The film thickness was measured gravimetrically and found to be 0.25±0.04 μm.

For the double coating, the monomer solution was spin-coated using a spin speed of 6000 RPM onto substrates identical to those described above, and polymerization was performed by heating the coated substrate to 110° C. for 3 minutes, as above. The film was rinsed with methanol and dried under nitrogen gas. Additional monomer solution (1.0 mL) was pipetted onto the polymer film and spin-coated, again using a spin speed of 6000 RPM. The double-layered film was rinsed with methanol, dried under nitrogen gas as above, and its surface resistance and transparency were quantified and found to be 50 ohms/square and 64% (averaged over the range 350–750 nm), respectively. The thickness of the double film was measured gravimetrically and found to be 0.18±0.03 μm.

Comparison of properties shows that the double-layered film has a surface resistance 41% lower than that of the single-layer film, and has a transparency that is only 1% less. In addition, the total thickness of the double film is 28% less than that of the single film. This is another example of how the multilayering strategy can be even more effective in reducing surface resistance when derivatized EDOT monomer is used vs. underivatized EDOT. It also another example demonstrating that the method can yield films that have superior properties even though their additive thickness is less than their single-layer counterpart.

EXAMPLE 5

Figure 9:
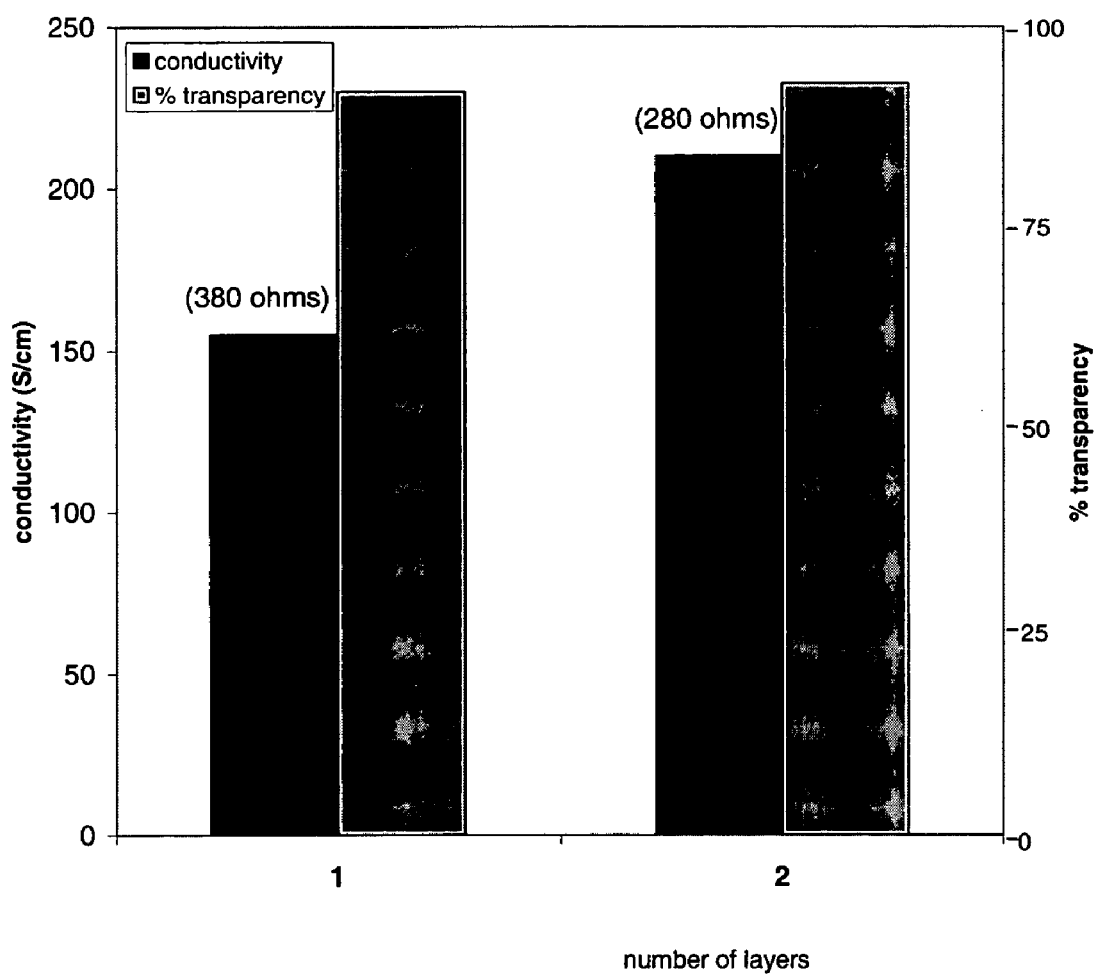
FIG. 9 is a graph comparing the properties of single and double layered films as made in Example 5.

Formation of single- and double-layered thin films of poly($C_4F_9$-EDOT) and comparison of properties—The results for Example 5 are given in FIG. 9. The polymer films were synthesized using a solution of $C_4F_9$-EDOT in 2-methoxyethanol that contained 0.58 M iron (III) tosylate, 0.66 M imidazole, and 0.33 M monomer. The total solute concentration was 35%.

For the single coating, 1.0 mL of the monomer solution was pipetted onto a clear plastic (polyethylene terepthalate) square substrate having a thickness of 0.1 mm and a surface area of 6.5 $cm^2$. The substrate was spin-coated using a spin speed of 3000 RPM. To form the polymer film, the substrate was immediately heated at atmospheric pressure to 110° C. for 3 min. It was then rinsed with methanol, dried with nitrogen gas and its surface resistance and transparency were quantified and found to be 380 ohms/square and 92% (averaged over the range 350–750 nm), respectively. The film thickness was measured gravimetrically and found to be 0.17±0.03 μm. The film conductivity was 155 S/cm.

For the double coating, the monomer solution was spin-coated using a spin speed of 6000 RPM onto substrates identical to those described above, and polymerization was performed by heating the coated substrate to 110° C. for 3 minutes, as above. The film was rinsed with methanol and dried under nitrogen gas. Additional monomer solution (1.0 mL) was pipetted onto the polymer film and spin-coated, again using a spin speed of 6000 RPM. The double-layered film was rinsed with methanol, dried under nitrogen gas as above, and its surface resistance and transparency were quantified and found to be 280 ohms/square and 93% (averaged over the range 350–750 nm), respectively. The thickness of the double film was measured gravimetrically and found to be 0.18±0.03 μm. The film conductivity was 200 S/cm.

Comparison of properties shows that the double-layered film has a surface resistance 26% lower than that of the single-layer film, leading to a conductivity that is 22% higher. The double-layered film has a transparency that is 1% greater than that of its single-layer counterpart.

EXAMPLE 6

Optimization of spin-coating conditions for various monomers—There are six fundamental process variables for the surface polymerization process—monomer concentration, molar ratio between solutes, choice of alcohol solvent, spin-coating speed in RPM, polymerization temperature, and polymerization time. It was determined that the polymer films could be formed using various ranges of four process variables and fixed values or types of the other two (Table 1).

TABLE 1

Process variables for spin coating and polymerization of EDOT, $C_4F_9$-EDOT, and $CH_2OH$-EDOT

| Variable | Range or type |
| --- | --- |
| Total solute concentration | 30–40 wt % |
| Molar ratio—monomer:oxidant:base | 1:2.6:2, 1:2:2, 1:1.75:2, 1:1.5:2 |
| Solvent | butanol, 2-propanol, 2-methoxyethanol |
| Spin speed | 1000–8000 RPM |
| Polymerization time | 3 minutes |
| Polymerization temperature | 110° C. |

Figure 10:
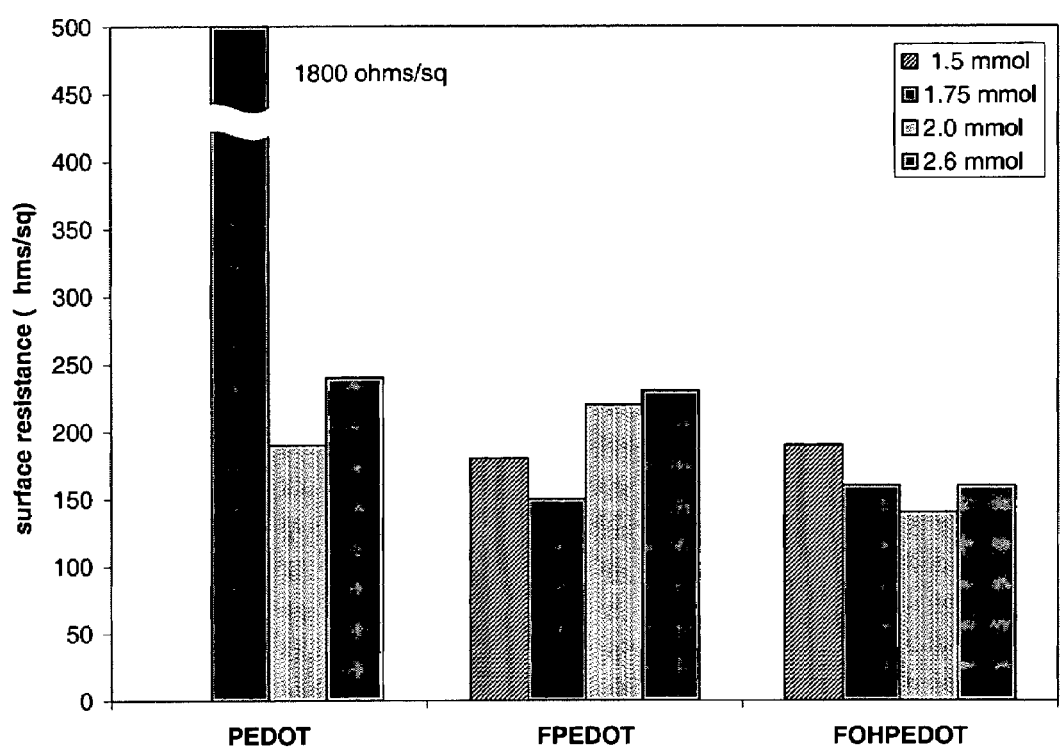
FIG. 10 is a graph comparing the properties of single and double layered films as made in Example 6.
Figure 11:
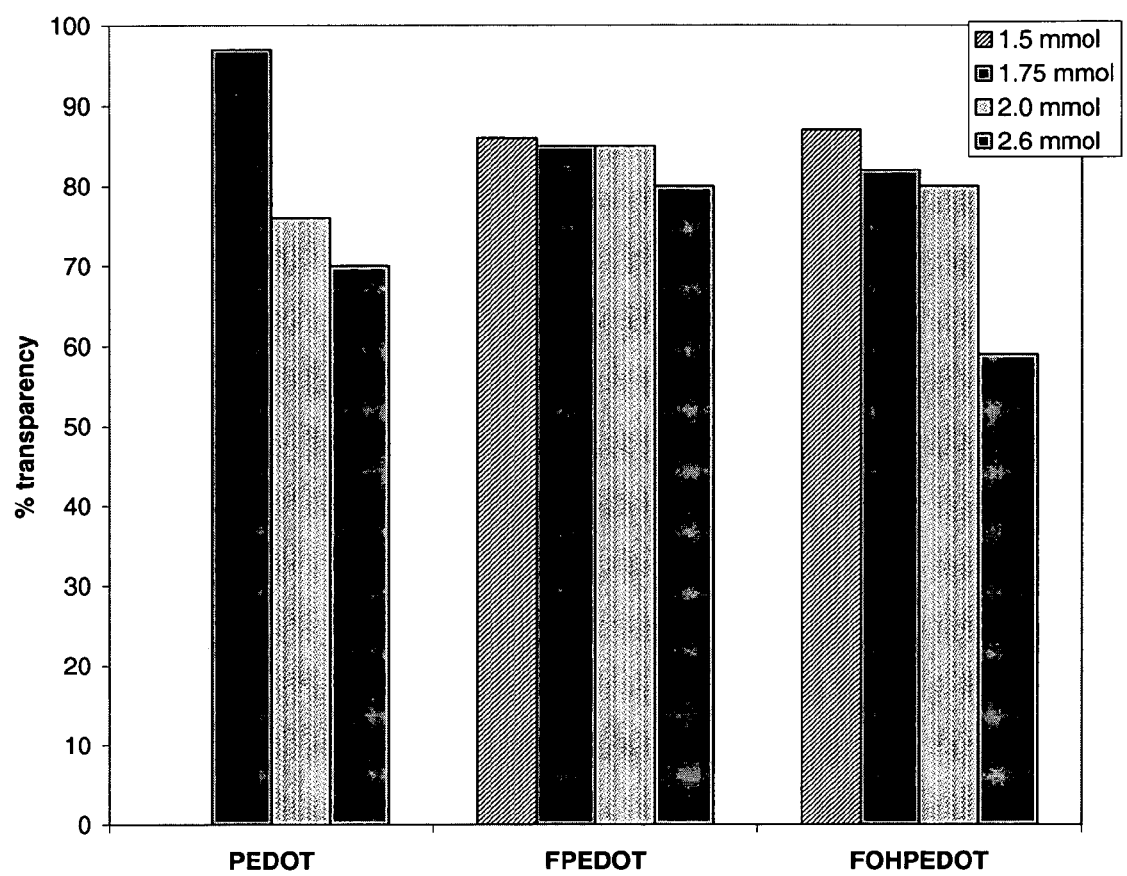
FIG. 11 is a graph comparing the properties of single and double layered films as made in Example 6.

Optimum conditions for the polymerization of each monomer (EDOT, $C_4F_9$-EDOT and $CH_2OH$-EDOT) were determined. It was found that the most desirable film properties, i.e. low surface resistance, high conductivity, and high transparency, were attained when the total solute concentration was held at about 40 wt %, the polymerization time held to 3 min, and the polymerization temperature maintained at 110° C. Within these constraints the polymerization solvent, the spin-coating speed, and the molar ratio between monomer, oxidant and imidazole base was varied as shown in Table 1. It was found that n-butanol and 2-methoxyethanol are the optimal solvents for the polymerization of $C_4F_9$-EDOT, $CH_2OH$-EDOT, and EDOT. In addition, the optimal spin-coating speeds are at the high end of the range, 6000 and 8000 RPM. Finally, the optimal solute molar ratios are 1:1.75:2 for $C_4F_9$-EDOT and $CH_2OH$-EDOT, and 1:2:2 for EDOT (see Table 1). This last variable may be the most important—small changes in the ratio often led to large changes in film properties, with a heavy dependence on monomer type. This behavior is summarized in FIGS. 10 and 11. In these experiments, the spin speed was held constant at 6000 RPM, double layers were formed, and n-butanol was used as solvent. The films were formed in the manner described in Examples 1–5 with the solute molar ratios varying from 1:1.5:2 to 1:2.6:2. The amount of oxidant was varied from 1.5 to 2.6 mmol. No PEDOT film was formed at 1.5 mmol oxidant. FIG. 10 shows surface resistance and FIG. 11 shows transparency.

Figure 12:
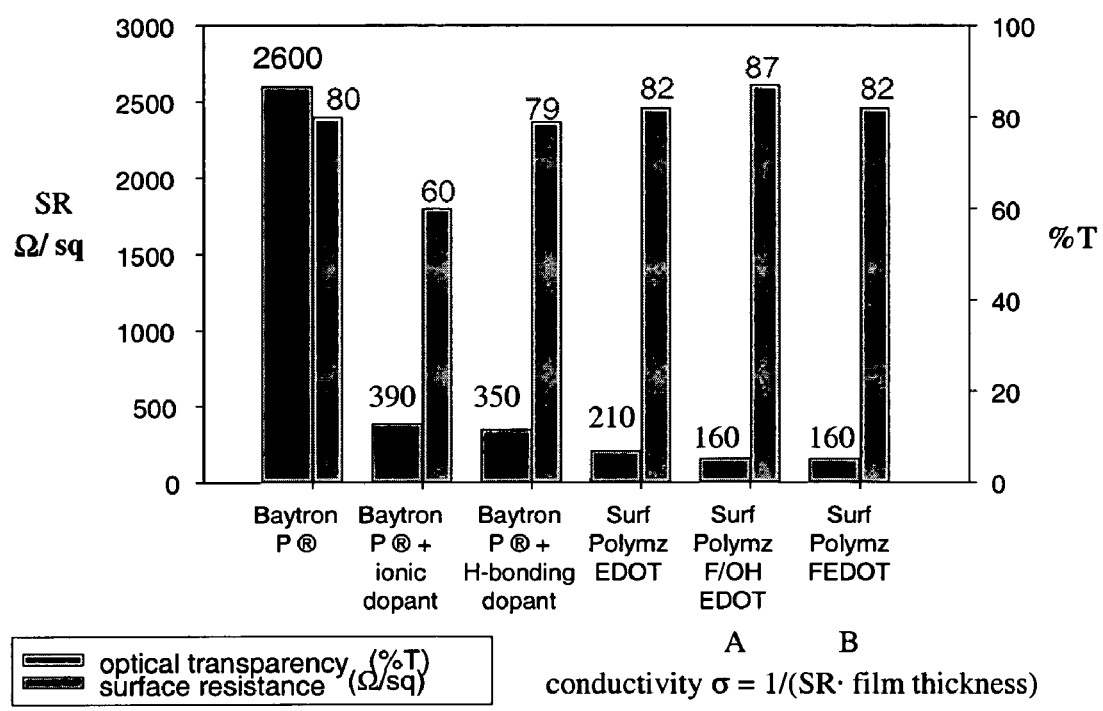
FIG. 12 is a graph comparing the properties of single and double layered films as made in Example 6.
Figure 13:
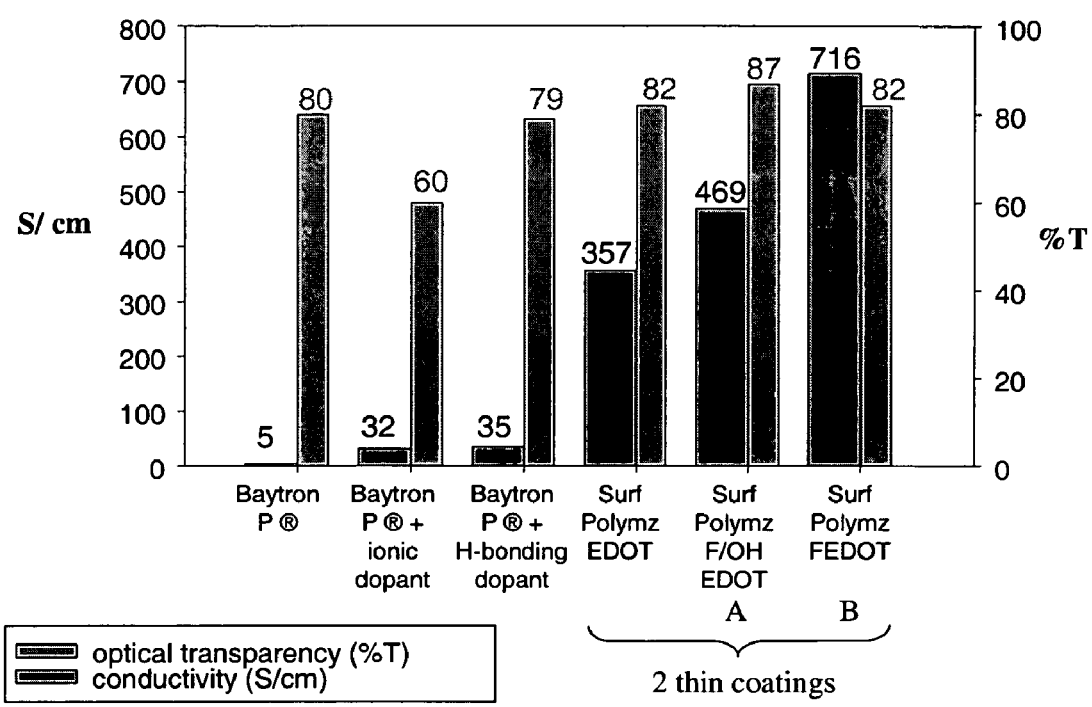
FIG. 13 is a graph comparing the properties of single and double layered films as made in Example 6.
Figure 14:
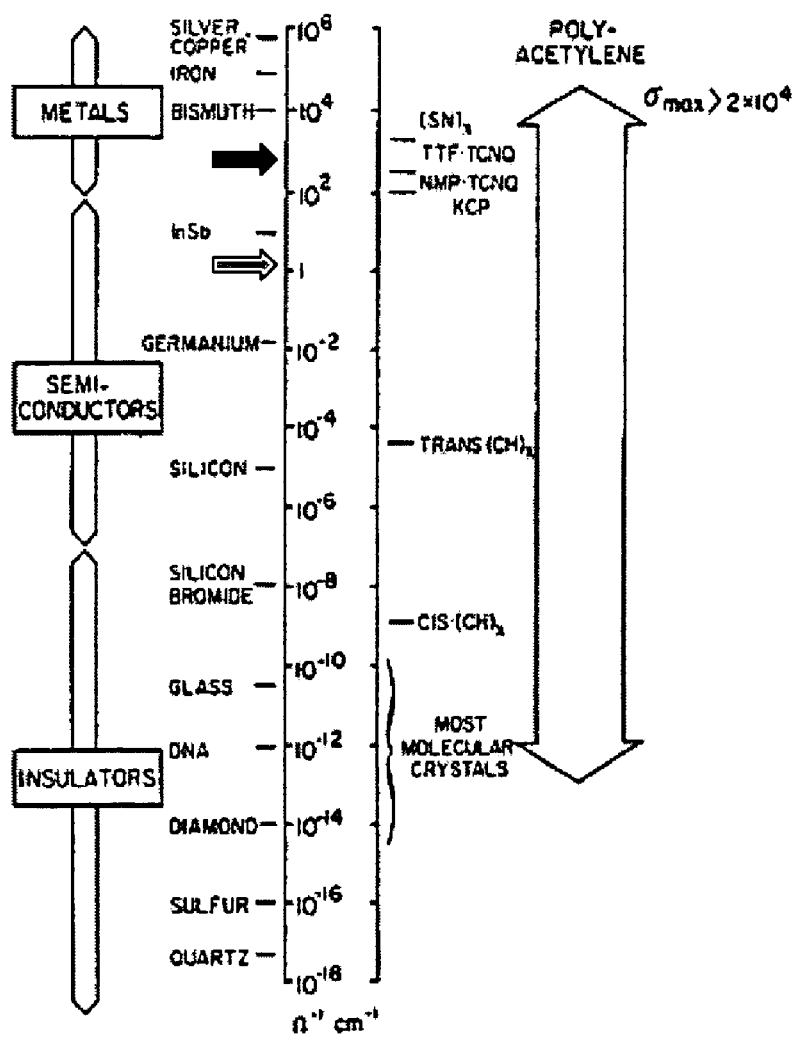
FIG. 14 is a graph comparing the properties of single and double layered films as made in Example 6.

The results of the optimization are displayed in FIGS. 12 and 13. In both Figures the characteristics of spin-coated commercially available conducting polymer (Baytron P®), are given in the left three column sets. In the right three column sets, the characteristics of films formed from each monomer-specific optimized polymerization process are given. In all three cases, the films are comprised of double layers formed at 8000 RPM. The system giving the most attractive properties is the $C_4F_9$-EDOT system, with a surface resistance of 160 ohms/sq, a conductivity of 716 S/cm, and an 82% transparency. The superiority of the double-layered films vs. the commercial systems is quite clear. FIG. 14 shows the conductivities of the double-layered spin-coated films, the commercially available material, and several families of metals, semi-conductors, and insulators. It is apparent that the double-layering approach allows the poly($C_4F_9$-EDOT) system to achieve metallic conductivity.

Multiple Coatings—Spin-Coating of PEDOT

In some applications, the film surface resistance is of greater importance than its bulk conductivity. The use of more than two thin films can yield drastically lower surface resistances while maintaining nearly constant film transparency.

EXAMPLE 7

Figure 15:
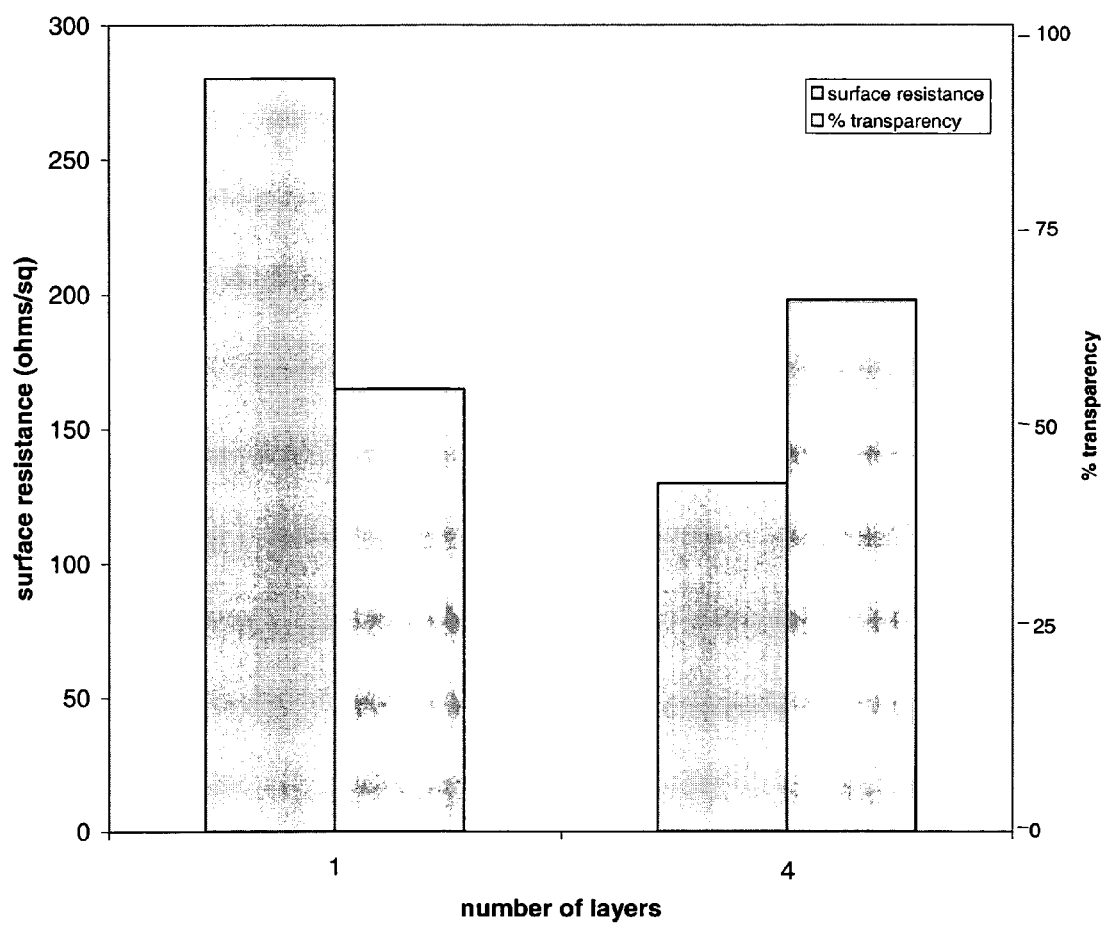
FIG. 15 is a graph comparing the properties of single and double layered films as made in Example 7.

Formation of single- and quadruple-layered thin films of poly(EDOT) and comparison of properties—The results for Example 7 are given in FIG. 15. The polymer films were synthesized using a solution of EDOT in 4 mL 1-butanol that contained 0.76 M iron (III) tosylate, 0.66 M imidazole, and 0.33 M monomer. The total solute concentration was 38%.

For the single coating, 1.0 mL of the monomer solution was pipetted onto a clear plastic (polyethylene terepthalate) square substrate having a thickness of 0.1 mm and a surface area of 6.5 cm². The substrate was spin-coated using a spin speed of 2000 RPM. To form the polymer film, the substrate was immediately heated at atmospheric pressure to 110° C. for 3 min. It was then rinsed with methanol, dried with nitrogen gas and its surface resistance and transparency were quantified and found to be 580 ohms/square and 82% (averaged over the range 350–750 nm), respectively.

For the quadruple coating, the monomer solution was spin-coated using a spin speed of 4000 RPM onto substrates identical to those described above, and polymerization was performed by heating the coated substrate to 110° C. for 3 minutes, as above. The film was rinsed with methanol and dried under nitrogen gas. This process was repeated three times, and the film surface resistance and transparency were quantified and found to be 250 ohms/square and 80% (averaged over the range 350–750 nm), respectively.

Comparison of properties shows that the quadruple-layered film has a surface resistance 57% lower than that of the single-layer film, with only a 2% sacrifice in optical transparency.

EXAMPLE 8

Figure 16:
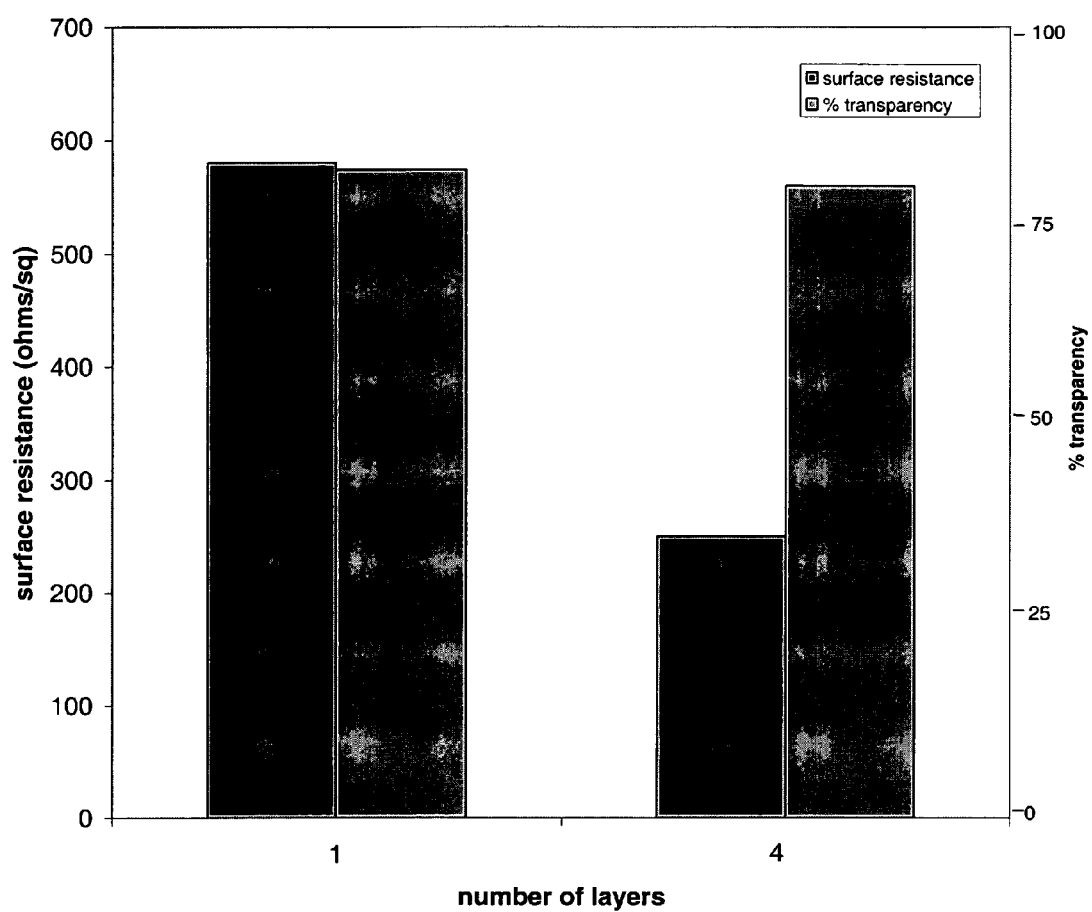
FIG. 16 is a graph comparing the properties of single and double layered films as made in Example 8.

Formation of single- and quadruple-layered thin films of poly(EDOT) and comparison of properties—The results for Example 8 are given in FIG. 16. The polymer films were synthesized using a solution of EDOT in 4 mL 2-propanol that contained 0.76 M iron (III) tosylate, 0.66 M imidazole, and 0.33 M monomer. The total solute concentration was 38%.

For the single coating, 1.0 mL of the monomer solution was pipetted onto a clear plastic (polyethylene terepthalate) square substrate having a thickness of 0.1 mm and a surface area of 6.5 cm². The substrate was spin-coated using a spin speed of 2000 RPM. To form the polymer film, the substrate was immediately heated at atmospheric pressure to 110° C. for 3 min. It was then rinsed with methanol, dried with nitrogen gas and its surface resistance and transparency were quantified and found to be 280 ohms/square and 55% (averaged over the range 350–750 nm), respectively.

For the quadruple coating, the monomer solution was spin-coated using a spin speed of 4000 RPM onto substrates identical to those described above, and polymerization was performed by heating the coated substrate to 110° C. for 3 minutes, as above. The film was rinsed with methanol and dried under nitrogen gas. This process was repeated three times, and the film surface resistance and transparency were quantified and found to be 130 ohms/square and 66% (averaged over the range 350–750 nm), respectively.

Comparison of properties shows that the double-layered film has a surface resistance 54% lower than that of the single-layer film, with an 8% increase in optical transparency.

The co-filed U.S. Patent Application to Martin et al., "Highly Conducting Transparent Thin Films Formed from New Fluorinated Derivatives of 3,4-Ethylenedioxythiophene," designated as Navy Case 84,103 is incorporated herein by reference.

We claim:

1. A polymer film comprising at least two layers, wherein each layer comprises a compound comprising the formula:

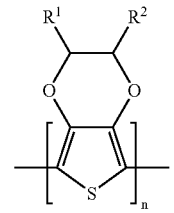

wherein $R^1$ and $R^2$ are independently selected organic groups; and wherein the layers are formed by repeated surface polymerization on a substrate.

2. The polymer film of claim 1, wherein the polymer is a homopolymer.

3. The polymer film of claim 1, wherein $R^1$ and $R^2$ are independently selected from the group consisting of hydrogen, alkyl, alkenyl, alkynyl, aromatic, ether, ester, hydroxyl, amine, thiol, thione, sulfide, sulfonate, phosphine, phosphate, and phosphonate.

4. The polymer film of claim 1, wherein $R^1$ and $R^2$ are both hydrogen.

5. The polymer film of claim 1, wherein the compound comprises the formula:

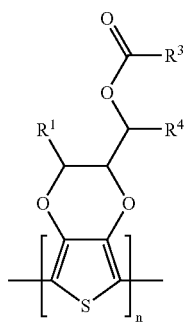

wherein R³ and R⁴ are independently selected organic groups.

6. The polymer film of claim 1, wherein the compound comprises the formula:

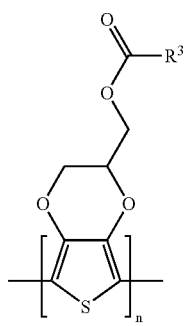

wherein R³ is an organic group.

7. The polymer film of claim 6, wherein R³ is a fluorinated group selected from the group consisting of alkyl, linear alkyl having from 1 to 14 carbon atoms, aromatic, cycloaliphatic, carbohydrate, amine, ketone, ether, alkenyl, alkynyl, secondary amine, tertiary amine, thione, sulfide, sulfonate, sulfate, phosphine, phosphate, and phosphonate.

8. The polymer film of claim 6, wherein R³ is perfluoroalkyl.

9. The polymer film of claim 6, wherein R³ is 1,1,2,2,3,3,4,4,4-nonafluorobutyl.

10. The polymer film of claim 6, wherein R³ is 1,1,2,2,3,3,4,4,5,5,6,6,7,7,8,8,8-heptadecylfluorooctyl.

11. The polymer film of claim 1, wherein every layer comprises the same compound.

12. The polymer film of claim 1, wherein the film comprises from two to ten layers.

13. The polymer film of claim 1, wherein the film comprises from two to four layers.

14. The polymer film of claim 1, wherein the film has a conductivity of at least about 100 S/cm and a transparency of at least about 80%.

15. The polymer film of claim 1, wherein the thickness of the polymer film is no more than about 1 μm.

16. A display device comprising the polymer film of claim 1.

* * * * *